United States Patent [19]

Makita

[11] 4,316,604
[45] Feb. 23, 1982

[54] VEHICLE HEIGHT ADJUSTING DEVICE

[75] Inventor: Naoki Makita, Yokohama, Japan

[73] Assignee: Tokico Ltd., Kanagawa, Japan

[21] Appl. No.: 123,884

[22] Filed: Feb. 22, 1980

[30] Foreign Application Priority Data

Feb. 22, 1979 [JP] Japan .................................. 54-21989
Feb. 22, 1979 [JP] Japan .................................. 54-21990
Apr. 9, 1979 [JP] Japan .................................. 54-46709

[51] Int. Cl.³ .............................................. F16F 3/07
[52] U.S. Cl. .................... 267/64.19; 280/711
[58] Field of Search ................ 267/65 B, 65 D, 65 R, 267/DIG. 1; 280/704, 709, 711, 712, 714

[56] References Cited

U.S. PATENT DOCUMENTS

2,067,482  1/1937  Foley .................................. 267/65 B
3,074,709  1/1963  Ballard et al. ...................... 267/65 B
3,327,590  6/1967  Johnson et al. .
3,954,257  5/1976  Keijzer et al. .

FOREIGN PATENT DOCUMENTS

53-26549  4/1978  Japan .
1061141  3/1967  United Kingdom ................ 280/709

*Primary Examiner*—Duane A. Reger
*Attorney, Agent, or Firm*—Wenderoth, Lind & Ponack

[57] ABSTRACT

A vehicle height adjusting device of includes a hydraulic damper having a tubular main body and a piston rod slidably projecting from one end of the main body, and an air spring unit having a resilient tubular wall member. The wall member has an inner wall portion and an outer wall portion which are closed at one end by a rolling wall portion formed of the inner and outer wall portions on relative reciprocation therebetween. The inner wall portion is sealingly connected to and surrounding the main body of the hydraulic damper, and the outer wall portion is sealingly connected to the piston rod at the projecting end portion thereof. An axial bore is formed in the projecting end portion of the piston rod for supplying pressurized gas into the air spring unit.

5 Claims, 6 Drawing Figures

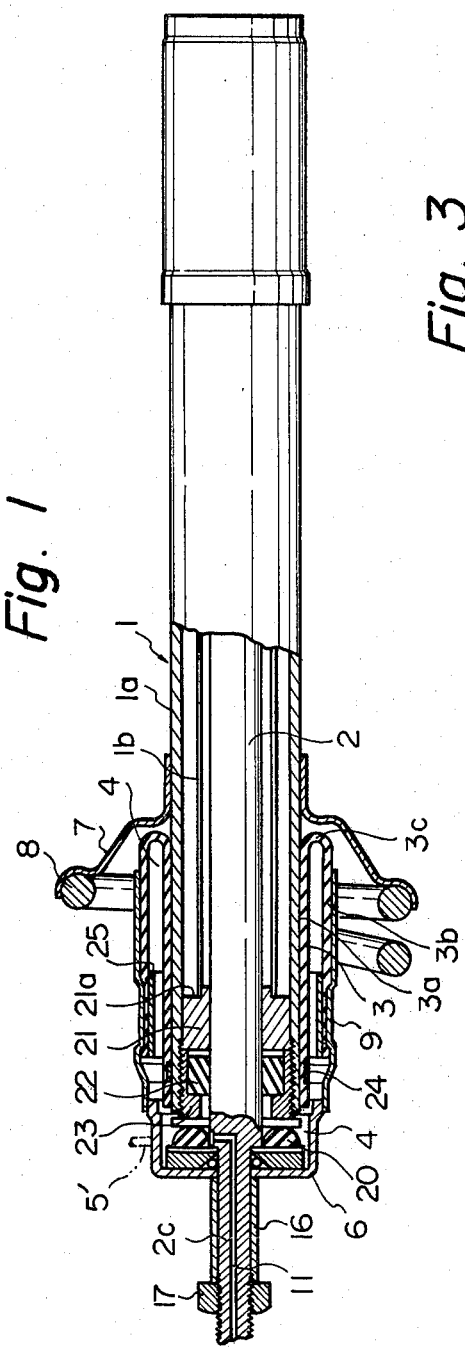

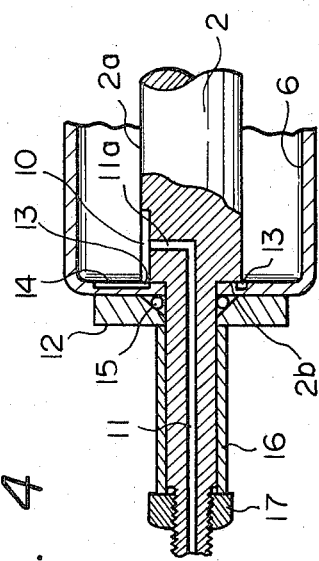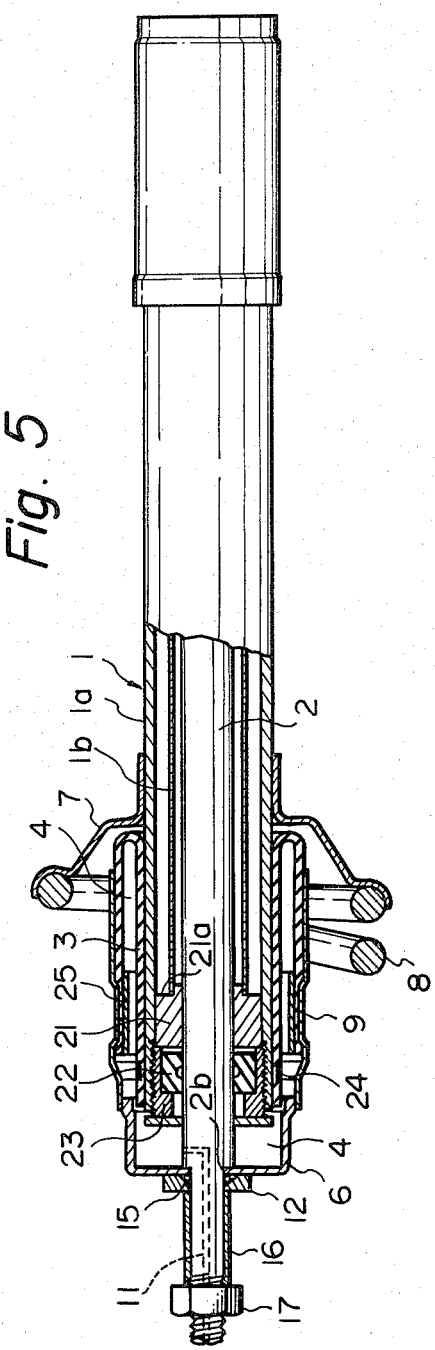

VEHICLE HEIGHT ADJUSTING DEVICE

BACKGROUND OF THE INVENTION

This invention relates to vehicle height adjusting devices and, particularly, to improvements in vehicle height adjusting devices of the type consisting of a hydraulic damper having a tubular main body and a piston rod slidably projecting from one end of the main body, and an air spring unit having a resilient tubular wall member. The wall member has an inner wall portion and an outer wall portion which are closed at one end by a rolling wall portion formed of the inner and outer wall portions on relative reciprocation therebetween. The inner wall portion is sealingly connected to and surrounds the main body of the hydraulic damper, and the outer wall portion is sealingly connected to the piston rod at the projecting end portion thereof.

The air spring unit is supplied with pressurized air or gas from an external source, and by changing the presence of air or gas supplied to the air spring unit, the overall length of the device can be adjusted.

Usually, a cap member formed of a rigid material is secured to or is sealingly and rotatably mounted on the projecting end portion of the piston rod, and the outer wall portion of the air spring unit is secured to the outer circumference of the cap member.

A fitting for connecting the air spring unit with the source of air or gas under pressure has usually been provided on the cap member, and a conduit connected to the fitting extends generally in a radially outward direction with respect to the longitudinal axis of the device.

When the vehicle height adjusting device of the aforementioned type are mounted on a vehicle, there are problems in the arrangement and the mounting of the conduit, particularly, when the device is utilized on a steerable wheel wherein the main body of the hydraulic damper and the air spring unit are rotatable with respect to the piston rod which is secured to the chasis of the vehicle and, particularly when an additional coil spring is provided between the main body and the projecting end portion of the hydraulic damper for affording an additional spring force, wherein the additional spring surrounds a substantial length of the air spring unit, thus interfering with the conduit.

SUMMARY OF THE INVENTION

An object of the present invention is to provide a vehicle height adjusting device of the type aforementioned wherein an axial bore is formed in the piston rod for supplying pressurized air or gas into the air spring unit.

Further objects and advantages of the invention will be apparent from the following description, reference being had to the accompanying drawings wherein preferred embodiments of the present invention are illustrated.

BRIEF DESCRIPTION OF THE ACCOMPANYING DRAWINGS

In the drawings:

FIG. 1 is a partial longitudinal sectional view of a vehicle height adjusting device according to the invention;

FIG. 2 is an enlarged view showing the essential portions of FIG. 1;

FIG. 3 is an end view as viewed along line III—III in FIG. 2;

FIG. 4 is a view similar to FIG. 2 but showing a modified embodiment;

FIG. 5 is a view similar to FIG. 1 but showing a further modified embodiment.

DETAILED DESCRIPTION OF THE PREFERRED EMBODIMENTS

Figure 6:
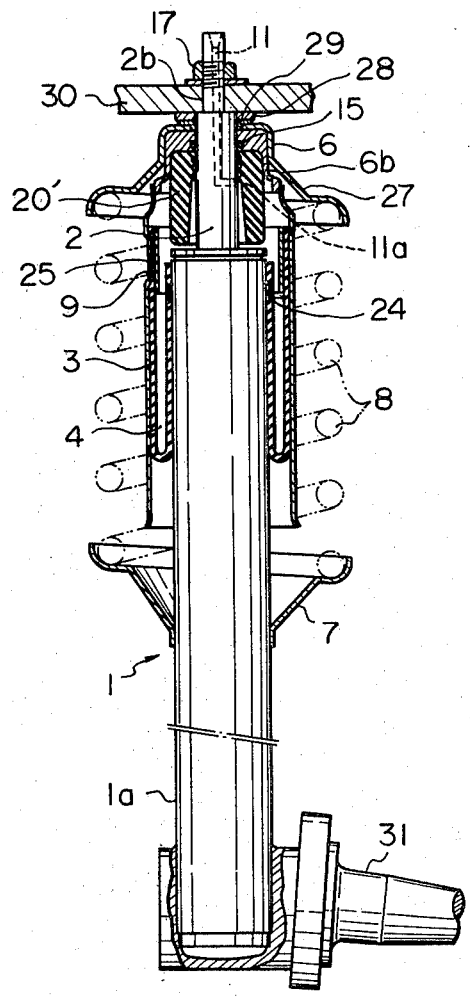
FIG. 6 is a partially broken longitudinal view of another embodiment of the present invention.

Referring to FIGS. 1–3, the vehicle height adjusting device shown in the drawings comprises a hydraulic damper and an air spring unit. The hydraulic damper includes a tubular main body 1 having an outer tube 1a and an inner tube 1b, and a piston rod 2 secured to a piston (not shown) working in the inner tube 1b. The air spring unit has a resilient flexible tubular wall member 3 having an inner wall portion 3a and an outer wall portion 3b. These wall portions are closed at one end by a rolling wall portion 3c formed of the inner and outer wall portions 3a and 3b on relative reciprocation therebetween. The inner wall portion 3a surrounds the outer circumference of the main body 1 and is sealingly connected thereto by a metal ring 24. The outer wall portion 3b is seaingly clamped between a protecting cover 9 and a backing ring 25 and is connected to the protecting cover 9 which, in turn, is secured to a generally cup-shaped outer shell 6 by welding or the like, and the outer shell 6 is sealingly connected to the piston rod 2. Thus, a closed space 4 is defined between the inner and outer wall portions 3a and 3b and in the interior of the outer shell 6 and the protecting cover 9. The device shown in the drawings further comprises an additional coil spring 8 extending between a spring retainer 7 secured to the outer tube 1a and a retainer (not shown) which is mounted on the outer end portion 2c of the piston rod 2 or the chassis (not shown) of a vehicle on which the device is mounted.

The projecting end portion 2c of the piston rod 2 is formed to have a reduced diameter to define an outwardly facing annular shoulder 2b at the step on the change in the diameter of the piston rod. The shoulder 2b acts to connect the outer shell 6 with the piston rod 2. As shown clearly in FIG. 2, an annular ring 12 abuts with the shoulder 2b and with the axially inner surface of the outer shell 6. An O-ring 15 is squeezed between the annular ring 12, the reduced diameter portion 2c of the piston rod 2 and the outer shell 6. The annular ring 12 and the outer shell 6 are secured to the piston rod 2 by a nut 17 screw-threaded on the outer end of the reduced diameter portion 2c of the piston rod 2 through a spacer sleeve 16. There are provided on or adjacent to the spacer sleeve 16, although not shown in the drawing, means for mounting a spring retainer cooperating with the spring retainer 7 to locate the spring 8, means for securing the piston rod 2 to the chasis of the vehicle, or the like.

An annular bumping rubber 20 is disposed between the annular ring 12 and the main body 1 to receive and damp the impact force transmitted to the outer shell 6 when the piston rod 2 is excessively retracted into the main body 1. It will be noted that the bumping rubber 20 is spaced from the adjacent end of the main body 1 in the normal operating condition of the device.

According to the invention, an axial bore 11 is formed in the piston rod 2, and the bore 11 is connected with a radial bore 11a which, in turn, opens to the space 4 of the air spring unit. In the illustrated embodiment, the radial bore 11a opens in an axially extending groove 10 formed in the outer periphery of the piston rod 2, and the groove 10 extends to the shoulder 2b. An annular groove 13 and a plurality of radially extending grooves 14 are, as clearly shown in FIG. 3, formed in a surface 12a of the annular ring 12, at which surface 12a the annular ring 12 abuts with the shoulder 2b of the piston rod 2 and, also, with the bumping rubber 20. Thus, air or gas under pressure supplied through the bores 11 and 11a can be freely introduced into the space 4 even when the bumping rubber 20 is deformed.

In prior art devices, pressurized air or gas has been supplied to the air spring unit through a conduit 5' mounted on the outer circumference of the outer shell 6, as shown in broken lines in FIG. 1. The conduit 5' is routed across the coil spring 8, thus causing interference therebetween. According to the invention a conduit (not shown) connecting the source of air or gas under pressure with the air spring unit is connected to the open end of the bore 11 of the piston rod 2. Thus, it is possible to route the conduit coaxially with respect to the piston rod. Therefore, the conduit will not interfere with the spring 8 and the reliability of the device can be improved.

FIG. 4 is a view similar to FIG. 2 but showing a modified embodiment. In the drawing, the annular ring 12 engages with the outer end surface of the outer shell 6, and the outer shell 6 engages with the shoulder 2b of the piston rod 2. The O-ring 15 is disposed between the annular ring 12, the outer shell 6 and the piston rod 2. Similar to the first embodiment, an axial groove 10 is formed in the outer circumference of the piston rod 2 and extends to the shoulder 2b. An annular groove 13 and radial grooves 14 are formed in the inner surface of the outer shell 6. Thus, pressurized air or gas supplied through axial and radial bores 11 and 11a can freely be introduced into the space 4 of the air spring unit even when the bumping rubber 20 (not shown in FIG. 4) is compressed.

The vehicle height adjusting device shown in FIG. 5 is similar to the embodiment of FIG. 4 but is somewhat modified therefrom. In FIG. 5, a radial bore connected to the axial bore 11 on the piston rod 2 opens simply in the circumference of the piston rod, since there is not provided any bumping rubber between the outer shell 6 and the main body 1.

FIG. 6 shows another embodiment wherein the vehicle height adjusting device according to the invention is applied to a steerable wheel. The device comprises, similar in a manner to the preceding embodiments, a hydraulic damper having a main body 1 and a piston rod 2 secured to a piston (not shown) working in the main body 1 and projecting from the upper end of the main body 1, and an air spring unit having a resilient flexible tubular member 3. The tubular member 3 is connected to the main body 1 by a metal ring 24 and is connected to a protecting cover 9 by a metal ring 25. The protecting cover 9 is secured to an outer shell 6 which, in turn, is rotatably mounted on the piston rod 2 at a position outwardly of the main body 1. An O-ring 15 is disposed between the outer shell 6 and the piston rod 2 to seal the interior of the air spring unit from the outside. A generally cup-shaped bumping rubber 20' is mounted on the inner surface of the outer shell 6 and surrounds the piston rod 2. There are formed a plurality of annular grooves in a bore of the bumping rubber 20' through which the piston rod 2 extends so as to minimize the frictional resistance when the bumping rubber 20' together with the outer shell 6 rotates with respect to the piston rod.

The upper end of the piston rod 2 is secured to a member 30 constituting a part of the body of a vehicle by means of a nut 17. The upward force acting on the outer shell 6 due to the pressure of air or gas in the air spring unit is transmitted to the member 30 through an upper spring retainer 27, a bush 29 and an anti-friction ring 28, so that the spring retainer 27 and the outer shell 6 can rotate with respect to the member 30.

A stub axle 31 is secured to the lower end of the main body 1 to mount thereon a steerable wheel such as the front wheel of a vehicle.

Air or gas under pressure is supplied through an axial bore 11 formed in the piston rod 2 into the air spring unit, and thus, a conduit (not shown) connecting the bore 11 with a source (not shown) of air or gas under pressure can be routed coaxially with respect to the rod 2.

In operating the vehicle height adjusting devices having the constructions heretofore described, an impact force acting on the device can be fully damped by the hydraulic damper, the air spring unit and the additional spring 8, and when it is desired to change the height of the vehicle, or when the height of the vehicle changes accidentally, the pressure of air or gas which has been supplied into the air spring unit is changed manually or automatically thereby adjusting the height of the vehicle.

In the embodiments of FIGS. 1–5, the hydraulic dampers are illustrated as being of the dual tube type, but, the hydraulic dampers may be of the single tube type.

As described heretofore, a conduit connected to the vehicle height adjusting device according to the invention to supply air or gas under pressure to an air spring unit can be routed coaxially with respect to the piston rod, thus, damage to the conduit can be minimized.

What is claimed is:

1. A vehicle height adjusting device comprising:
a tubular main body;
a piston rod slidably mounted within said main body and having an end projecting therefrom, said projecting end of said piston rod having an outwardly facing annular shoulder;
an air spring unit including a resilient flexible tubular wall member having an inner wall portion and an outer wall portion closed at one end by a rolling wall portion formed of said inner and outer wall portions on relative reciprocation therebetween, said inner wall portion being sealingly connected to and surrounding said main body;
a member abutting said shoulder and having an annular surface;
a generally cup-shaped member mounted on said projecting end of said piston rod and abutting said member, said outer wall portion being sealingly secured to said cup-shaped member; and
means for supplying pressurized gas into a space defined between said inner and outer wall portions of said air spring unit, said means comprising an axial bore formed in said piston rod, an axially extending groove formed in the outer circumference of said piston rod and extending to said shoulder, a radial bore extending from said axial bore and opening into said axial groove, and at least one radially extending groove extending along said annular surface of said member.

2. A vehicle height adjusting device comprising:
a tubular main body;
a piston rod slidably mounted within said main body and having an end projecting therefrom, said projecting end of said piston rod having an outwardly facing annular shoulder defined by a reduced diameter portion;
an air spring unit including a resilient flexible tubular wall member having an inner wall portion and an outer wall portion closed at one end by a rolling wall portion formed of said inner and outer wall portions on relative reciprocation therebetween, said inner wall portion being sealingly connected to and surrounding said main body;
a generally cup-shaped member mounted on said projecting end of said piston rod and located with respect thereto by said shoulder, said cup-shaped member having therein an opening through which extends said reduced diameter portion, an annular space defined between said opening and said reduced diameter portion being sealed by a seal ring, said outer wall portion being sealingly secured to said cup-shaped member; and
said piston rod having formed therein an axial bore for supplying pressurized gas into a space defined between said inner and outer wall portions of said air spring unit.

3. A vehicle height adjusting device comprising:
a tubular main body;
a piston rod slidably mounted within said main body and having an end projecting therefrom, said projecting end of said piston rod having an outwardly facing annular shoulder;
an air spring unit including a resilient flexible tubular wall member having an inner wall portion and an outer wall portion closed at one end by a rolling wall portion formed of said inner and outer wall portions on relative reciprocation therebetween, said inner wall portion being sealingly connected to and surrounding said main body;
a generally cup-shaped member sealingly and rotatably mounted on said projecting end portion, said outer wall portion being sealingly secured to said cup-shaped member; and
said piston rod having formed therein an axial bore for supplying pressurized gas into a space defined between said inner and outer wall portions of said air spring unit.

4. A vehicle height adjusting device as claimed in claim 3, further comprising a coil spring extending between a lower retainer secured to said main body and an upper retainer secured to said cup-shaped member, said coil spring surrounding said air spring unit.

5. A vehicle height adjusting device as claimed in claim 3, further comprising a generally cup-shaped bumping rubber mounted in the bottom end of said cup-shaped member and cooperating with the adjacent end of said main body when the device contracts by a predetermined amount.

* * * * *